Patented Feb. 19, 1952

2,586,274

UNITED STATES PATENT OFFICE 2,586,274

PROCESS FOR PRESERVING FOODSTUFFS WHICH ARE SUBJECT TO THE ATTACK OF FUNGI

Frederik Dirk Tollenaar, Utrecht, Netherlands, assignor to Nederlandse Centrale Organisatie voor Toegepast Natuurwetenschappelijk Onderzoek, The Hague, Netherlands, a corporation of the Netherlands No Drawing. Application October 19, 1948, Serial No. 55,438. In the Netherlands November 26, 1947

15 Claims. (Cl. 99—224)

It is well-known that esters of gallic acid (3,4,5-trihydroxy benzoic acid) in low concentrations, substantially retard the autoxidation of edible oils and fats. For this reason, therefore, they are occasionally added to oils and fats. For this purpose there are generally used the lower esters of gallic acid, such as the methyl, ethyl or propyl ester, as these are the easiest to prepare. Inasmuch as, in recent years, some methods for the preparation of the higher esters of gallic acid have become known, it is now also possible to add these higher esters to edible oils and fats. The antioxidant action of these higher esters is, in general, somewhat lower than that of the lower esters. It is therefore mostly a question of raw materials and price, an economic problem, as to which esters of gallic acid will be used to prevent oxidative rancidity of oils and fats.

According to the present invention a certain group of gallic acid esters, notably the esters prepared from gallic acid and aliphatic alcohols having 8–12 carbon atoms, is now added to common and luxury foodstuffs, which are subject to the attack of fungi. The said foodstuffs may also be treated therewith.

Surprisingly, it has been found, that the gallic acid esters of aliphatic alcohols having 8–12 carbon atoms, unlike the gallic acid esters of alcohols having less than 8 or more than 12 carbon atoms, exert a strong fungicidal action.

In the following table the relative fungicidal activity has been listed of a number of gallic acid esters, the second column listing the checking of the mycelium growth, the third column listing the checking of germination of spores.

*Stereum purpureum* Fries and *Penicillium italicum* Wehmer, respectively, served as test objects.

| Ester | Mycelium growth | Germination spores |
|---|---|---|
| Methyl gallate | 1 | <1 |
| Ethyl gallate | 2 | 1 |
| n-Propyl gallate | 4 | 4 |
| n-Butyl gallate | 8 | 16 |
| n-Amyl gallate | 24 | 32 |
| Octyl gallate | 384 | 768 |
| Dodecyl gallate (Lauryl gallate) | 512 | <1 |
| Hexadecyl gallate (cetyl gallate) | 8 | <1 |

As may be seen from the table, the fungicidal activity of the series of esters, with regard to the mycelium growth, gradually rises, until, at octyl gallate, there occurs a jump towards higher values. The top activity is at lauryl gallate, which is 512 times more active than methyl gallate. After which compound there occurs an abrupt descent in activity. It may be observed in this respect, that the fungicidal activity of lauryl gallate as regards the mycelium growth is about $\frac{1}{10}$ of that of the extremely potent fungicide tetramethyl-thiuram-disulfide.

The course of the fungicidal activity of the series of esters with respect to the germination of spores is even more remarkable. In this case the top occurs at octyl gallate, which under the test conditions used, is 768 times more active than ethyl gallate, after which an abrupt descent in activity takes place.

According to the present invention it may be advantageous to use a mixture of gallic acid esters in order to prevent the common and luxury foodstuffs from being attacked by fungi. Particularly useful herefor is a mixture of octyl gallate, which most vigorously checks the germination of spores and lauryl gallate which has the most potent action upon mycelium growth.

The process according to the present invention is advantageously used in preserving common and luxury foodstuffs, which are subject to the attack of fungi, such as butter, margarine, coconut oil, palm-kernel oil, cake and similar baking products with a moisture content higher than 10%, rye bread, smoked fish, meat, salad dressing, eggs, chocolate products and the like. In many cases it is favorable to add the esters prepared from gallic acid and alcohols having 8–12 carbon atoms to the foodstuffs. In some cases this is not necessary whereas in other cases, such as in the case of smoked fish, it is not even possible. In these cases it is sufficient to apply the esters to the exterior of the foodstuffs in question. This may be done by impregnating said foodstuffs with an emulsion of the esters in water or with a solution of the esters (e. g. in alcohol, glycerol or arachidic oil), said emulsion or solution being applied with a brush or by spraying.

The concentrations to be used vary, depending upon the esters used and upon the nature of the product to be preserved. However in general they are from 0.005 to 0.03%.

It should also be remarked, that the gallic acid esters of aliphatic alcohols having 8–12 carbon atoms are not toxic at all, which was apparent from the tests performed on animals.

I claim:

1. As a new article of manufacture, a manufactured foodstuff, normally subject to fungi attack and resistant to autoxidation, having incorporated therein a gallic acid ester of an aliphatic alcohol of 8–12 carbon atoms, in an amount sufficient to inhibit fungi attack.

2. As a new article of manufacture, a manufactured foodstuff normally subject to fungi attack and resistant to autoxidation, having incorporated therein .005–.03% of a gallic acid ester of an aliphatic alcohol of 8–12 carbon atoms.

3. As a new article of manufacture, a manufactured foodstuff normally subject to fungi attack and resistant to autoxidation, having incorporated therein octyl gallate, in an amount sufficient to inhibit fungi attack.

4. As a new article of manufacture, a manufactured foodstuff, normally subject to fungi attack and resistant to autoxidation, having incorporated therein dodecyl gallate, in an amount sufficient to inhibit fungi attack.

5. As a new article of manufacture, a manufactured foodstuff, normally subject to fungi attack and resistant to autoxidation, having incorporated therein a mixture of octyl gallate and dodecyl gallate, in an amount sufficient to inhibit fungi attack.

6. As a new article of manufacture, a manufactured foodstuff normally subject to fungi attack and resistant to autoxidation, having incorporated therein .005–.03% of octyl gallate.

7. As a new article of manufacture, a manufactured foodstuff normally subject to fungi attack and resistant to autoxidation, having incorporated therein .005–.03% of dodecyl gallate.

8. As a new article of manufacture, a manufactured foodstuff normally subject to fungi attack and resistant to autoxidation, having incorporated therein .005–.03% of a mixture of octyl and dodecyl gallates.

9. A composition of matter comprising a manufactured foodstuff, normally subject to fungi attack and resistant to autoxidation, and a gallic acid ester of an aliphatic alcohol of 8–12 carbon atoms, in a small amount, sufficient to inhibit fungi attack.

10. A composition of matter comprising a manufactured foodstuff, normally subject to fungi attack and resistant to autoxidation and .005–.03% of a gallic acid ester of an aliphatic alcohol of 8–12 carbon atoms as a fungicidal agent.

11. A method of inhibiting fungi growth in manufactured foodstuffs which comprises, incorporating in a foodstuff, a small amount, sufficient to inhibit fungi growth, of a gallic acid ester of an aliphatic alcohol of 8–12 carbon atoms.

12. A method of inhibiting fungi growth in manufactured foodstuffs which comprises, incorporating in a foodstuff .005–.03% of a gallic acid ester of an aliphatic alcohol of 8–12 carbon atoms.

13. A method of inhibiting fungi growth in manufactured foodstuffs which comprises, incorporating in a foodstuff .005–.03% of octyl gallate.

14. A method of inhibiting fungi growth in manufactured foodstuffs which comprises, incorporating in a foodstuff .005–.03% of dodecyl gallate.

15. A method of inhibiting fungi growth in manufactured foodstuffs which comprises, incorporating in a foodstuff .005–.03% of a mixture of octyl and dodecyl gallates.

FREDERIK DIRK TOLLENAAR.

REFERENCES CITED

The following references are of record in the file of this patent:

UNITED STATES PATENTS

| Number | Name | Date |
|---|---|---|
| 2,255,191 | Sabalitischka et al. | Sept. 9, 1941 |
| 2,483,099 | Morris et al. | Sept. 27, 1949 |

OTHER REFERENCES

Chem. Abstracts, vol. 39, page 4767 (1945).

Chem. Abstracts, vol. 39, pages 1700–1701 (1945).

Chem. Abstracts, vol. 26, pages 3617–18 (1932).